(No Model.)
W. D. McCAULY.
CULTIVATOR.
No. 568,866. Patented Oct. 6, 1896.
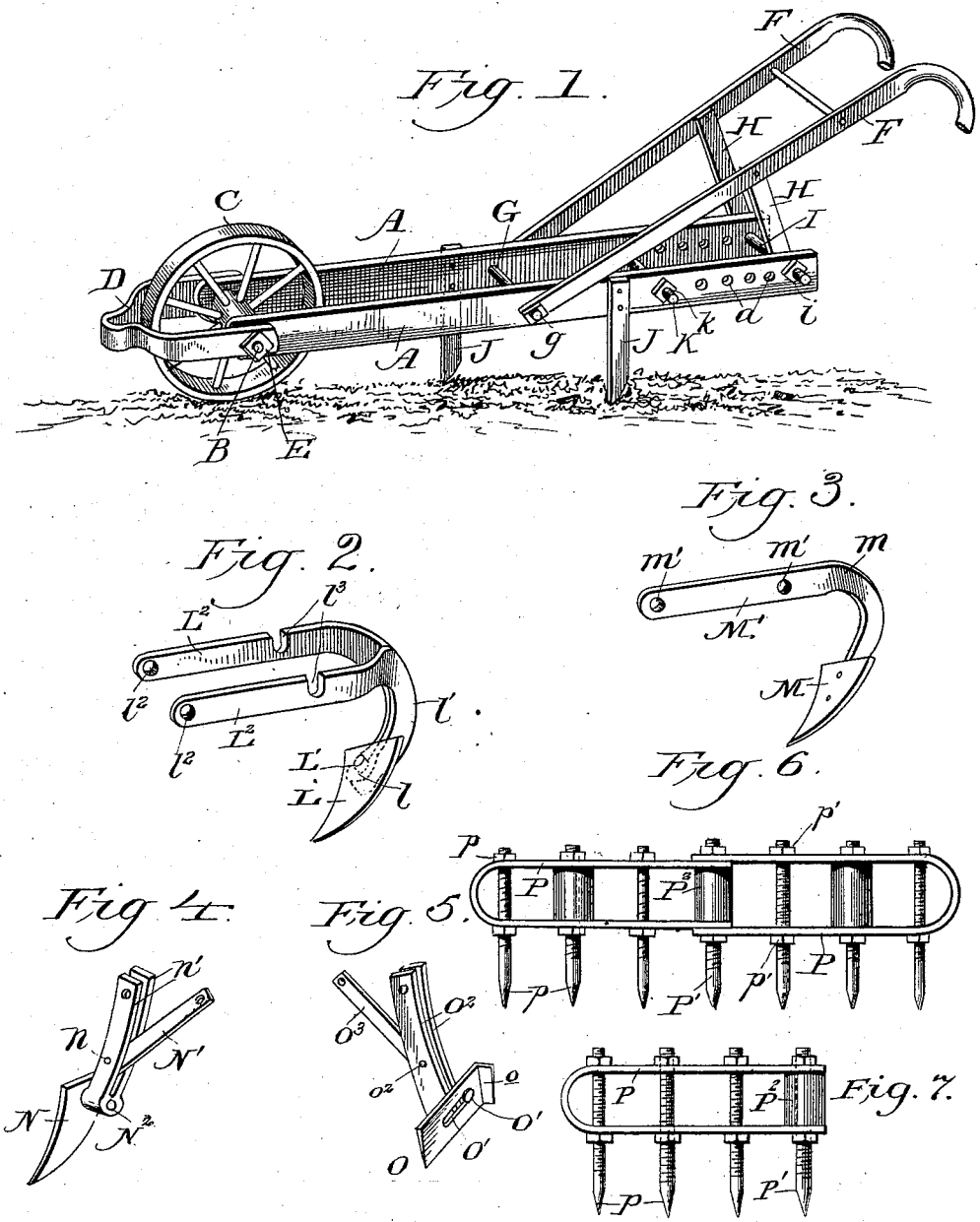
Witnesses
M. E. Garman.
P. C. Jones.
Inventor
Wm. D. McCauly
N. H. Willsdie
Attorneys

UNITED STATES PATENT OFFICE.

WILLIAM D. McCAULY, OF ELMORE, ARKANSAS.

CULTIVATOR.

SPECIFICATION forming part of Letters Patent No. 568,866, dated October 6, 1896.

Application filed November 21, 1895. Serial No. 569,688. (No model.)

*To all whom it may concern:*

Be it known that I, WILLIAM D. MCCAULY, a citizen of the United States, residing at Elmore, in the county of Hot Spring and State of Arkansas, have invented certain new and useful Improvements in Cultivators; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in agricultural implements, and it has for its objects among others to provide a simple and cheap implement that can be used for a variety of purposes by the mere changing of the plow or plows for the required implement, which can be quickly and easily done simply by removing the nut and bolt upon which the plow or other implement is supported.

Other objects and advantages of the invention will hereinafter appear and the novel features thereof will be specifically defined by the appended claims.

The invention in this instance resides in the peculiar combinations and the novel construction, arrangement, and adaptation of parts, all as more fully hereinafter described, shown in the drawings, and then particularly pointed out in the claims.

The invention is clearly illustrated in the accompanying drawings, which, with the letters of reference marked thereon, form a part of this specification, and in which—

Figure 1 is a perspective view of my improvement with the plows and other devices removed. Fig. 2 is a perspective view of the single plow and its support removed from the beams. Fig. 3 is a similar view of the side plow or coverer removed. Fig. 4 is a perspective view of one of the plows, showing a modified form of support. Fig. 5 is a like view of one of the cotton-scrapers. Fig. 6, in elevation, shows the double-harrow attachment detached from the beams. Fig. 7, in elevation, shows the side-harrow attachment detached from the beams.

In Fig. 7 is shown a side-harrow attachment. It comprises one U-shaped bar Q, through the open end of which is a bolt $Q'$, around which is a collar or sleeve $Q^2$, as shown. Harrow-teeth $q$ of any suitable form are held in the top and bottom bars of the frame by means of nuts $q'$ on their threaded shanks. This harrow can be used on any culitvator-frame by removing the two first teeth and placing astride beams A, then replacing same two teeth and making fast by means of their nuts $q'$. This harrow can be used at any desired angle, right or left handed, and the teeth are so arranged as to make it very desirable as a cultivator of crops of any kind. The bar Q of this side harrow can also be used for a double plow by removing the four teeth and placing in said bar the frame of the double plow.

Like letters of reference indicate like parts throughout the several views.

Referring now to the details of the drawings by letter, A designates the beams, in the forward ends of which is held a rod or shaft B, upon which is mounted to revolve the supporting-wheel C, which may be of any required diameter and of any preferred form of construction.

D is a yoke the ends of the parallel side bars of which are pivotally supported upon the ends of the rod or shaft B, which project beyond the beams, and upon the said ends are the nuts E, which prevent displacement of the yoke and permit of its ready removal when desired.

F F are the handles, secured at their forward ends to the beams A by a suitable rod G and nuts $g$, while between their ends these handles are braced by and secured to the standards H, which rise from the beams at the rear ends thereof, being in this instance shown as mounted on the cross-rod I, which is held in the rear ends of the beams and provided at one or both ends with the nut $i$.

Secured to the beams to the rear of the wheel C are the two pieces J, the lower ends of which are sharpened or tapered, as shown, and which may serve as markers as well as to support the rear end of the device when not in use.

The beams A, near their rear ends, are provided with a plurality of holes $a$, as shown, in any of which is designed to be inserted the removable rod K, which is provided at one or both ends with a nut $k$. Between the beams or upon them may be supported any desired kind or style of implement. In Fig. 2 I have shown a single plow L held upon a stud L' between the eye or loop $l$, formed by the bending of the bar $l'$, which at this point is doubled, as shown, and the ends are spread to form the parallel bars or arms $L^2$, the ends of which are provided with the holes $l^2$, while to the rear of the said holes the bars are formed upon their upper edges with the curved notches or recesses $l^3$, as shown. This plow is applied by placing the bars $L^2$ outside the beams and springing the same over the ends of the bolt or rod K and then bringing or raising the rear portion until the notches or recesses $l^3$ are received on the ends of the rod I, between the nuts $i$, which have been loosened for that purpose, and the outer faces of the beams, and then by screwing up said nuts the bars will be held firmly to the beams with the plow at the rear in the center of the space between the beams. This plow may be used for breaking land, opening beds, or furrowing land for any purpose, and, furthermore, any plow may be attached to the foot of the plow or the bar $l'$, as may be required.

The side plow M (shown in Fig. 3) may be used either in place of the plow L or in connection therewith. It is attached to the arm M', which is slightly offset, as at $m$, and is provided with the holes $m'$ to receive the bolts I and K, upon which the arm is supported. There may be one of these upon each side of the beams. This plow or coverer may be employed for covering seeds of any description, and may also be used as a double plow for listing land by attaching right and left hand, as will be readily understood.

In Fig. 4 the plow N is shown as carried by the arm N', which is pivoted, as at $n$, between the parallel arms $n'$, or the plow may be mounted on the stud $N^2$, held in the eye of the arms in the same manner as is the plow L of Fig. 2, and the arm N' pivoted, as shown, between the arms. This plow may be employed in lieu of the plow L when desired.

In Fig. 5 is shown a cotton-scraper O, which is wedge-shaped in vertical section, as shown, having one end turned at a right angle, as shown at $o$, and likewise sharpened, while the body portion is provided with an elongated slot $o'$, in which works a pin O' on the arm or support $O^2$, so that it may be adjusted thereon. To the arms $O^2$ is pivotally connected, as at $o^2$, the attaching-bar $O^3$. These scrapers are to be used either singly or double and for the purpose of scraping young crops of any kind.

In Fig. 6 I have shown a harrow attachment. It comprises the two substantially U-shaped bars P, arranged with their open ends overlapping and held upon the bolt P', around which is a collar or sleeve $P^2$, as shown. Harrow-teeth $p$, of any suitable form, are held in the top and bottom bars of the frame by means of nuts $p'$ on their threaded shanks. This harrow may be used at any desired angle, either right or left handed, and the teeth are so arranged as to make it very desirable as a cultivator of crops of any kind while young. Either half or both may be employed at the same time, as may be preferred.

Other forms of devices may be employed in place of those above described, if desired, and attached in a similar manner.

Modifications in detail may be resorted to without departing from the spirit of the invention or sacrificing any of its advantages.

The wheel C serves as a protection to both the horse and man, being a chief supporter of the weight of the front end of the machine, thereby relieving the horse of all unnecessary weight and jars that would be produced by the plow coming in contact with an obstruction, such as grubs and the like. The wheel also protects the plowman.

What I claim as new is—

1. A frame having perforated beams in combination with a cultivator provided with a standard having notched and perforated parallel arms extending rearward and uniting in a single downwardly-curved bar to the forward end of which is attached a cultivating-shovel, as set forth.

2. A frame having perforated beams and bolts and nuts fitting said perforations, combined with a cultivator provided with a standard having notched and perforated arms extending rearwardly fitting outside of said frame and registering with said bolts, as set forth.

3. In a cultivator, a frame composed of parallel beams, provided with a plurality of holes for the axle-rod, the transverse frame-rods, and the plow attachments, and adapted as described for the detachable connection of the plows, the cotton-scraper, and the harrows as set forth.

In testimony whereof I affix my signature in presence of two witnesses.

WILLIAM D. McCAULY.

Witnesses:
J. W. EASLEY,
E. H. TANNIHILL.